United States Patent [19]
Yamamoto et al.

[11] Patent Number: 5,657,434
[45] Date of Patent: Aug. 12, 1997

[54] METHOD AND APPARATUS FOR INPUTTING, DISPLAYING AND PRINTING IMAGES

[75] Inventors: Yoshijiro Yamamoto, Toyokawa; Mitsumasa Kako, Tokai; Michifumi Ishigami, Nagoya, all of Japan

[73] Assignee: Brother Kogyo Kabushiki Kaisha, Nagoya, Japan

[21] Appl. No.: 531,774

[22] Filed: Sep. 21, 1995

[30] Foreign Application Priority Data

Oct. 5, 1994 [JP] Japan .................................. 6-268290

[51] Int. Cl.$^6$ ........................................................ G06F 15/00
[52] U.S. Cl. ................................................................ 395/133
[58] Field of Search .......................... 395/133, 134, 395/138; 345/118, 121, 123, 125

[56] References Cited

U.S. PATENT DOCUMENTS

| | | | |
|---|---|---|---|
| 5,324,123 | 6/1994 | Hattori | 400/207 |
| 5,586,237 | 12/1996 | Baecker et al. | 395/133 |

*Primary Examiner*—Phu K. Nguyen
*Attorney, Agent, or Firm*—Oliff & Berridge

[57] ABSTRACT

A method and apparatus for inputting and displaying images includes an input device and a display screen that can only display a portion of an input image. The display range appearing in the display screen is automatically and continuously adjusted to display different portions of the input image based on the position of the input device so that the portions of the image surrounding a cursor are always displayed on the display screen.

25 Claims, 15 Drawing Sheets

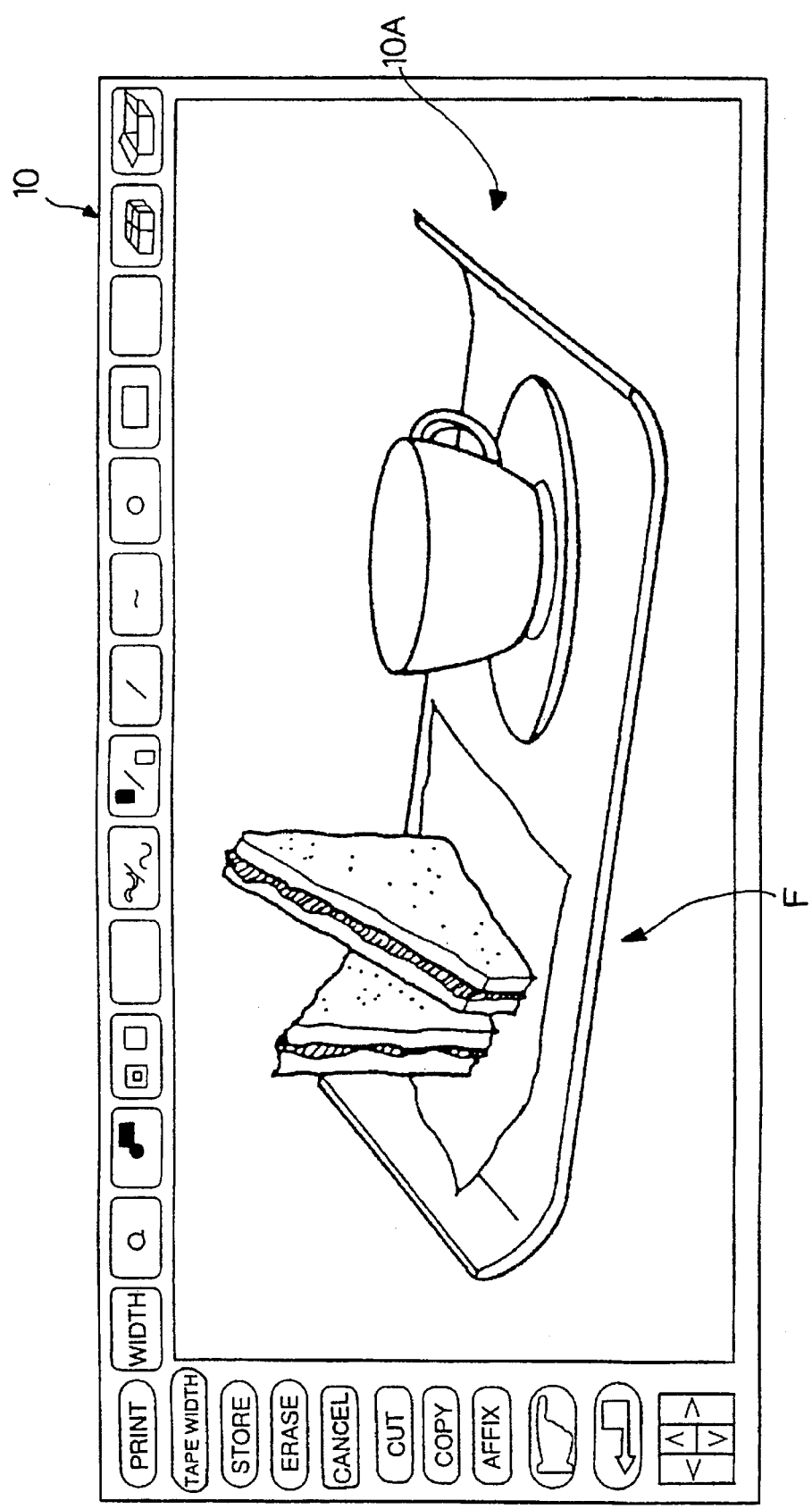

METHOD AND APPARATUS FOR INPUTTING, DISPLAYING AND PRINTING IMAGES

BACKGROUND OF THE INVENTION

1. Field of the Invention

The present invention relates to a tape printing apparatus that enables a user to input an image using an input device such as an input pen and a graphic input panel, a mouse or a joystick while simultaneously viewing the image on a display screen. The device may also be capable of printing the input image on an elongated recording medium to make a pictorial tape label. In particular, the invention relates to a tape printing apparatus capable of automatically and continuously switching the display of the display screen to different portions of an image in response to the position of the input device on the graphic input panel so that an image which is too large to be entirely displayed on the display screen may be drawn and edited smoothly.

2. Description of the Related Art

It is known to input graphical images into a general purpose computer using an input device comprised of a graphic input panel and an input pen. Such devices allow a user to indicate particular positions on the input panel with the input pen to input an image. Alternately, an image may be input using a mouse, a joystick, a trackball, cursor keys, or other devices for indicating particular positions of an input image.

A display screen connected to the computer usually displays all or a portion of the input image so that the user can verify that the image is correctly entered. A printer may also be connected to the computer to print the input image.

Unfortunately, if the prior art apparatus utilizes a graphic input panel and an input pen, the user must make awkward key operations of Cursor keys when the portion of the image he would like displayed is not within the current display range, or when the screen has scrolled beyond the intended position as a result of key operations. When using such a device, if the user wishes to edit a portion of the image that is not currently displayed on the display screen, the user must scroll the screen using a Cursor-left key or a Cursor-right key.

If a prior art apparatus uses an input device such as a mouse, a joystick, a trackball, or the like as the input device, the input device may also operate to scroll the screen automatically when the cursor goes out of the range of display screen. Although such automatic scrolling is useful for automatically shifting the displayed image, the display may continue to scroll, even after the cursor movement has ceased. Thus, even using a device with automatic scrolling, the user must make awkward operations of the input device, such as moving it in the opposite direction of the scrolling, to stop the scrolling of the display and to bring the intended portion of the image back into the display range. In addition, when the cursor is pushed out of the display range and then brought back into the display range by movements of the input device, the positional relations of the input device and cursor may have varied, and it may be necessary to move the input device again to restore their positional relations. Thus, the user must make repeated awkward operations of the input device to display an intended portion of an image and it is difficult, if not impossible, for the user to display an intended portion of an image correctly in a single action.

SUMMARY OF THE INVENTION

The present invention is intended to overcome the foregoing prior art deficiencies, and it is an object of the invention is to provide a method and apparatus for switching the display of a display screen automatically and continuously in response to the input position of an input device during entry of an image which is too large to be completely displayed on the display screen. A device embodying the invention allows a user to draw and edit images smoothly.

In order to achieve the above object, one embodiment of the invention includes a graphic input panel and input pen as a means for inputting an image, a display screen for displaying an image input on the graphic input panel, and a printing device for printing images on a recording tape. The device further includes left and right scroll borders located at the left and right ends of the display area of the display screen, a first detection means which detects whether the input position of the input pen on the graphic input panel is beyond the left or right scroll border, a first scroll means which automatically scrolls the display range of the display screen to the left when the first detection means detects that the input position of the input pen is located to the left of the left scroll border, and a second scroll means which automatically scrolls the display range of the display screen to the right when the first detection means detects that the input position of the input pen is located to the right of the right scroll border.

Using such a tape printing apparatus, a user may draw an image on the graphic input panel with the input pen while it is displayed in the display area of the display screen, and the user need not make any awkward cursor key entries.

In another embodiment of the invention, a mouse or other similar device may be used as the input device. When the user of the device scrolls the cursor to the left of the left scroll border using the input device, the display range of the display screen is automatically shifted to the left. A similar process occurs when the user scrolls the cursor to the right of the right scroll border.

Because the display of a display screen of a device embodying the invention is switched automatically and continuously in response to the input position of the input device, it is possible for a user of the device to easily draw and edit images that are too large to be completely displayed on the display screen.

BRIEF DESCRIPTION OF THE DRAWINGS

Preferred embodiments of the present invention will be described in detail with reference to the following figures, wherein:

FIG. 5 is a diagram used to explain the entry of an image using the graphic input panel of an apparatus embodying the invention;

DESCRIPTION OF PREFERRED EMBODIMENTS

A tape printing apparatus based on a specific embodiment of this invention will be explained in detail with reference to the drawings. The description of this specific embodiment is not intended to be in any way limiting, and devices and methods embodying the invention could utilize a variety of display and input devices. In addition, although the invention is described with reference to a device that adjusts the display to show different horizontal portions of a large image, the invention is equally applicable to a device that adjusts the display to show different vertical portions of a large image, or different horizontal and vertical portions of a large image.

Figure 1:
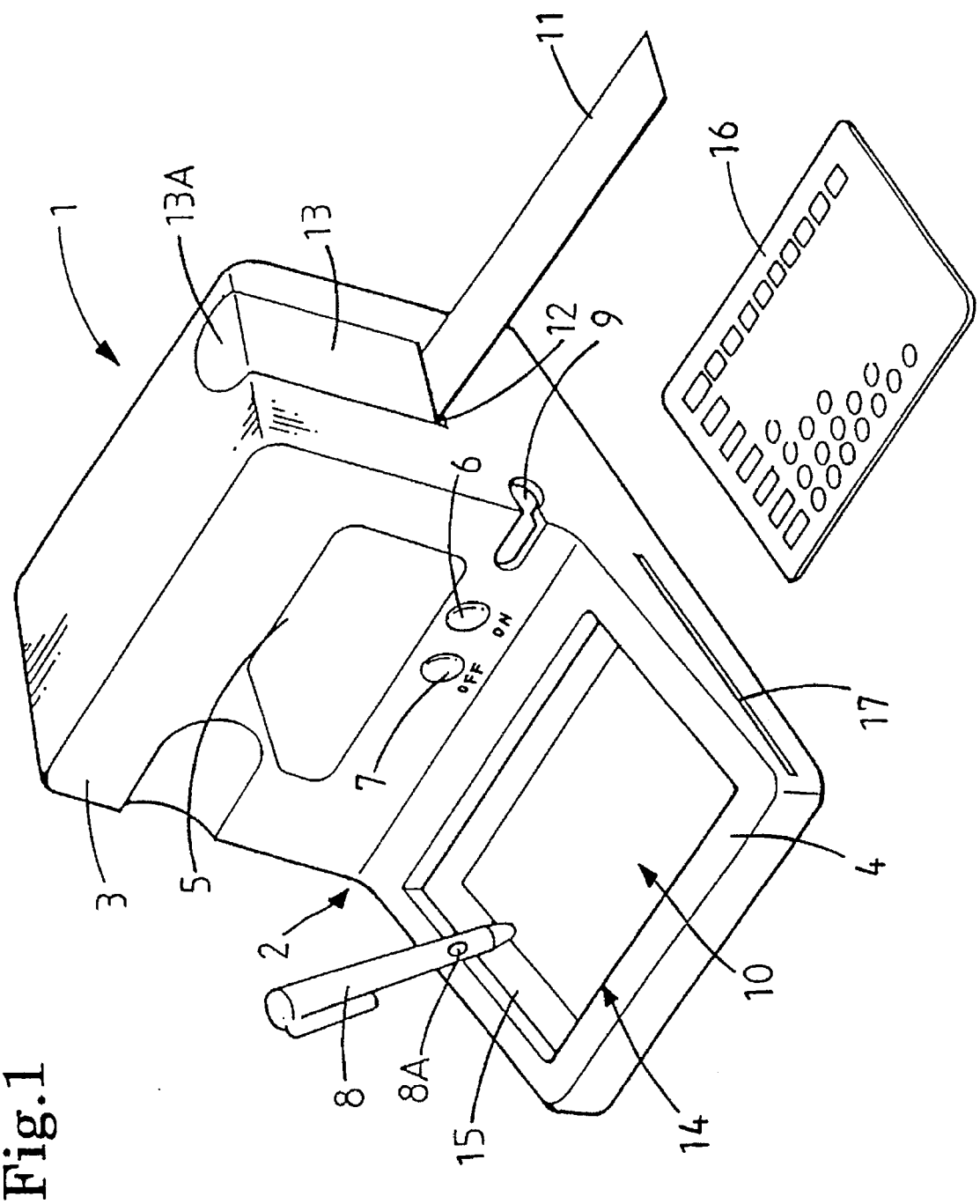
FIG. 1 is a perspective diagram of a tape printing apparatus embodying the invention.

The tape printing apparatus 1 shown in FIG. 1 has a main body 2 having an L-shaped side profile. The apparatus 1 comprises an upright section 3 and a flat section 4. The upright section 3 includes a liquid-crystal display screen 5 located on the front of the apparatus, which is capable of displaying a drawing cursor and an image. The upright section 3 also incorporates a tape printing device (not shown), that prints images on an elongated recording medium. Such tape printing devices are known in the art, and explanation thereof is omitted.

A tape delivery port 12 is formed on the right side wall of the upright section 3. A printed pictorial tape 11 emerges from the tape delivery port 12 after printing. A tape cutter 13 is disposed above the tape delivery port 12. The tape cutter 13 has a handle 13A, which may be pushed down by a user to cut off a printed tape 11.

As shown in FIGS. 6–10, the display screen 5 has a display area 5A, a left scroll border 5B and a right scroll border 5C. A power-on switch 6 and a power-off switch 7 are disposed below the display screen 5, and a pen holder 9 for holding an input pen 8 is formed near the power-on switch 6.

The flat section 4 of the device 1 includes an image entry board 14, on which the user draws an image using an input pen 8. The image entry board 14 comprises a transparent touch sensitive panel (not shown) made up of two transparent sheet electrodes interleaved with a transparent spacer. In the example shown in FIG. 1, a transparent graphic input panel 10 (refer to FIG. 2) may be placed under the touch sensitive panel. A pattern sheet showing the image the user would like to input is then placed under the graphic input panel 10.

As shown in FIG. 5, the pattern sheet is visible through the transparent touch sensitive panel and the graphic input panel 10. The user can input the image on the pattern sheet by tracing the image shown on the pattern sheet with the input pen 8 on the touch sensitive panel.

An input button 8A is provided on the input pen 8. The input button 8A is depressed by the user when the user wishes input image data with the input pen 8. When the input button 8A is depressed, the device records the position of the input pen 8 on the image entry board 14. This positional data is used to add image data to the input image.

Figure 2:
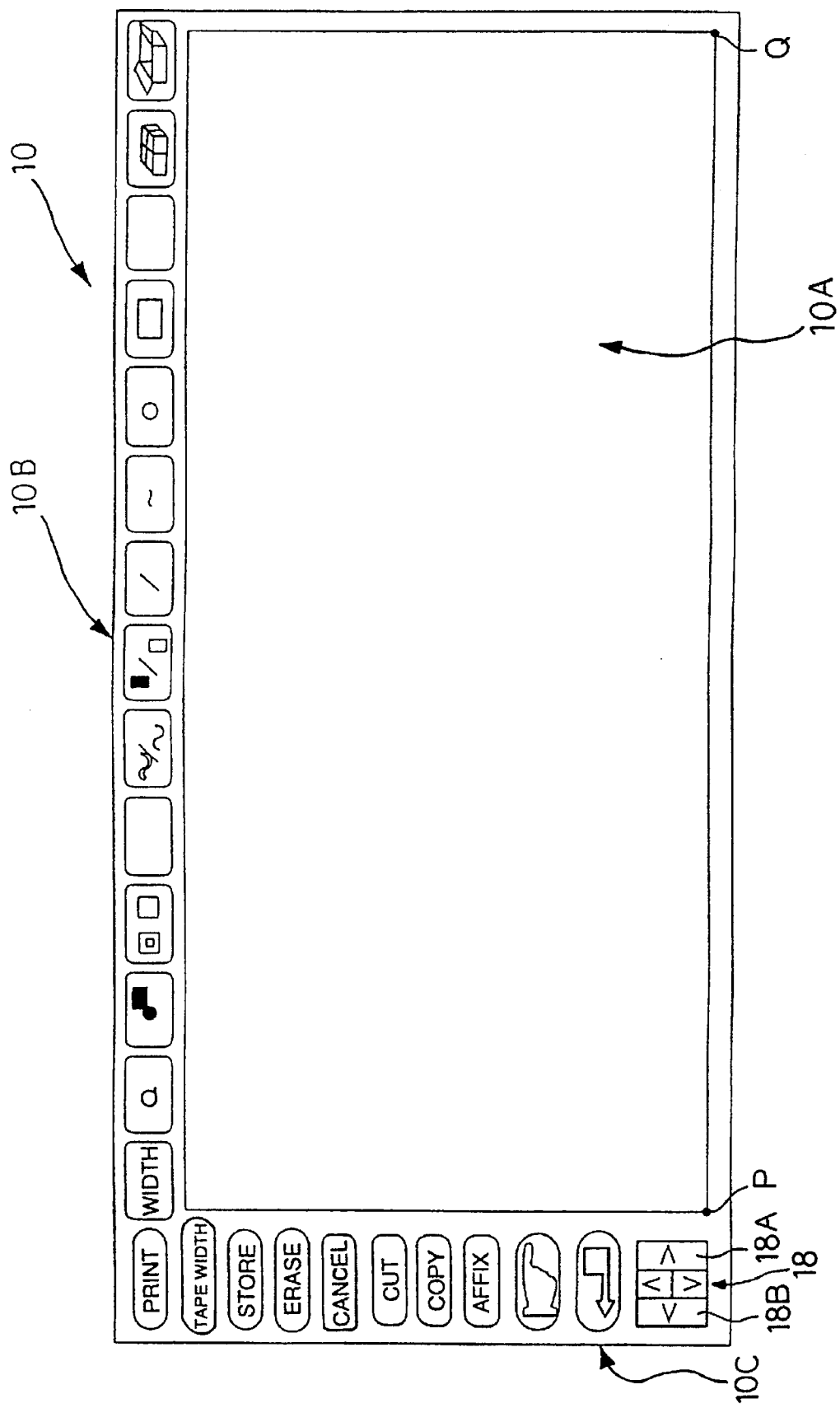
FIG. 2 is a plan view of a graphic input panel of a apparatus embodying the invention.

The graphic input panel 10 shown in FIGS. 2 and 5 is merely one of a variety of input panels available. Other input panels could include a keyboard panel 16 for inputting alphanumeric and symbolic characters. When the user inserts the input panel through the slot 17, the type of input panel is detected by a panel type sensor disposed beneath the image entry board 14. Once the type of input panel is known, the device automatically switches to a corresponding input mode.

The graphic input panel 10, which is mounted on the image entry board 14 will now be explained with reference to FIG. 2. The graphic input panel 10 has an image drawing area 10A that corresponds to a single "page." When an image is so large that it extends over several pages, a partition is inserted between the pages. The x-coordinates of the page partitions correspond to the left and right ends of the drawing area. For example, if the drawing area 10A of FIG. 2 has a left end position P with an x-coordinate of 0 and a right end position Q with an x-coordinate of 100, a second page of an image would have a left end x-coordinate of 100 and a right end x-coordinate of 200. Accordingly, the x-coordinates of the left and right ends of each additional page would be incremented by 100.

In drawing an image, the user places a pattern sheet having an original image under the graphic input panel 10 and traces the image on the touch sensitive panel over the transparent graphic input panel 10 with the input pen 8. The graphic input panel 10 has a number of editing tool icons 10B located along the upper marginal section of the graphic input panel 10 to aid the user in drawing an image. In addition, a number of command icons 10C, such as a page left command icon 18B, or page right command icon 18A, are located at the left marginal section of the graphic input panel 10.

Figure 3:
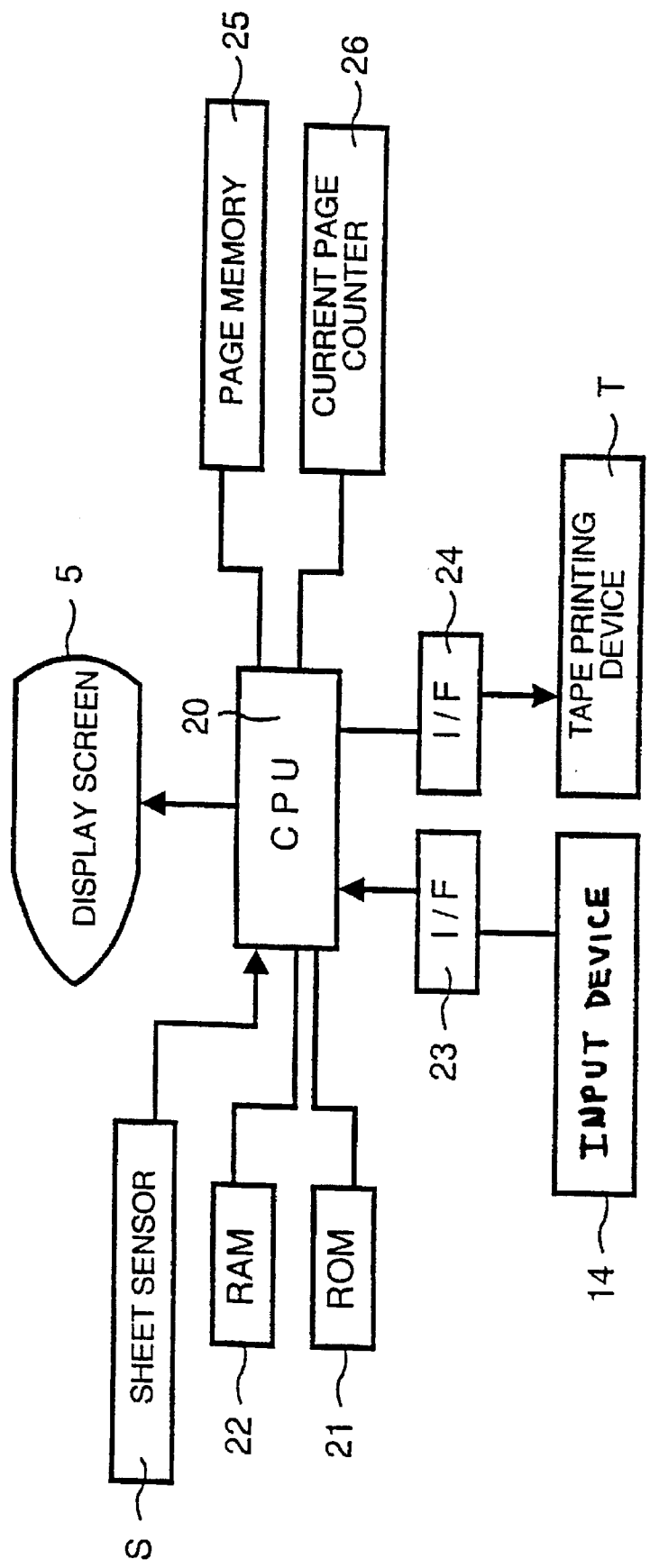
FIG. 3 is a block diagram showing the major components of an apparatus embodying the invention.

The functional interconnections between the major elements of a tape printing apparatus 1 embodying the invention will now be explained with reference to FIG. 3. The nucleus of the apparatus is a controller, or CPU 20, which is connected to a ROM 21 and a RAM 22. The CPU 20 controls a tape printing device T based on control programs stored in the ROM 21. The ROM 21 also stores a graphical data inputting/editing program for processing graphic data in response to operations of the input device 14. The RAM 22 temporarily stores the results of computations of the CPU 20.

When the input device includes a touch sensitive screen utilizing with replaceable input panels, as described above, the ROM 21 may store a plurality of control programs, each of which corresponds to a different type of input panel. The sheet sensor S detects the type of input panel that is inserted into the device, and the device automatically utilizes the corresponding control program. When the sheet sensor S does not detect the presence of an input panel, the device may be automatically set to a graphic input mode, and a drawing cursor may appear on the display screen 5.

When the apparatus is operating in the graphic input mode, and the user is entering an image that extends over multiple consecutive pages, the user can point to the page right command icon 18A with the input pen 8 to advance to the next page. In operation, the number of times the user selects the page right command icon 18A (or the page left command icon 18B) is counted, a page counter 26 increments or decrements the page number of the currently displayed page, and the resulting page number is stored in a page memory 25.

When the user selects the print command icon with the input pen 8, the graphic data stored in the RAM 22 is read out through an interface 24 to a tape printing device T. The printing device T prints the image corresponding to the data in the RAM 22 on an elongated recording medium to make a pictorial tape label 11.

The image input process of a tape printing apparatus 1, as described above, will now be explained with reference to the Figures.

To input an image, the user places a prepared pattern sheet under the touch sensitive panel and the graphic input panel 10 of the image entry board 14. The user can see the image on the pattern sheet (sandwiches and coffee on a tray in the example shown in FIG. 5) through the transparent touch sensitive panel and the transparent graphic input panel 10. The user traces the image on the touch sensitive screen with the input pen 8, while viewing it through the touch sensitive panel and graphic input panel 10.

When the user begins to input an image, the display screen displays an image that corresponds to the left side of the drawing area of the graphic input panel 10. The left end position P of the drawing area 10A of the graphic input panel 10 has an x-coordinate that corresponds to the x-coordinate of the left-end position A of the display area 5A of the display screen 5. Accordingly, the left scroll border 5B and the right scroll border 5C of the display area 5A (shown in FIG. 6) have x-coordinates that corresponds to matching positions on the drawing area 10A. Because, in this embodiment, the display area 5A of the display screen 5 is only capable of displaying approximately half of an image drawn on the graphic input panel 10 (one page), the right end position of the display area 5A will correspond to a position in approximately the center of the graphic input panel 10.

A control process for displaying the image input as described above will now be described with reference to the flow charts of the FIGS. 4A–4D.

Figure 4A:
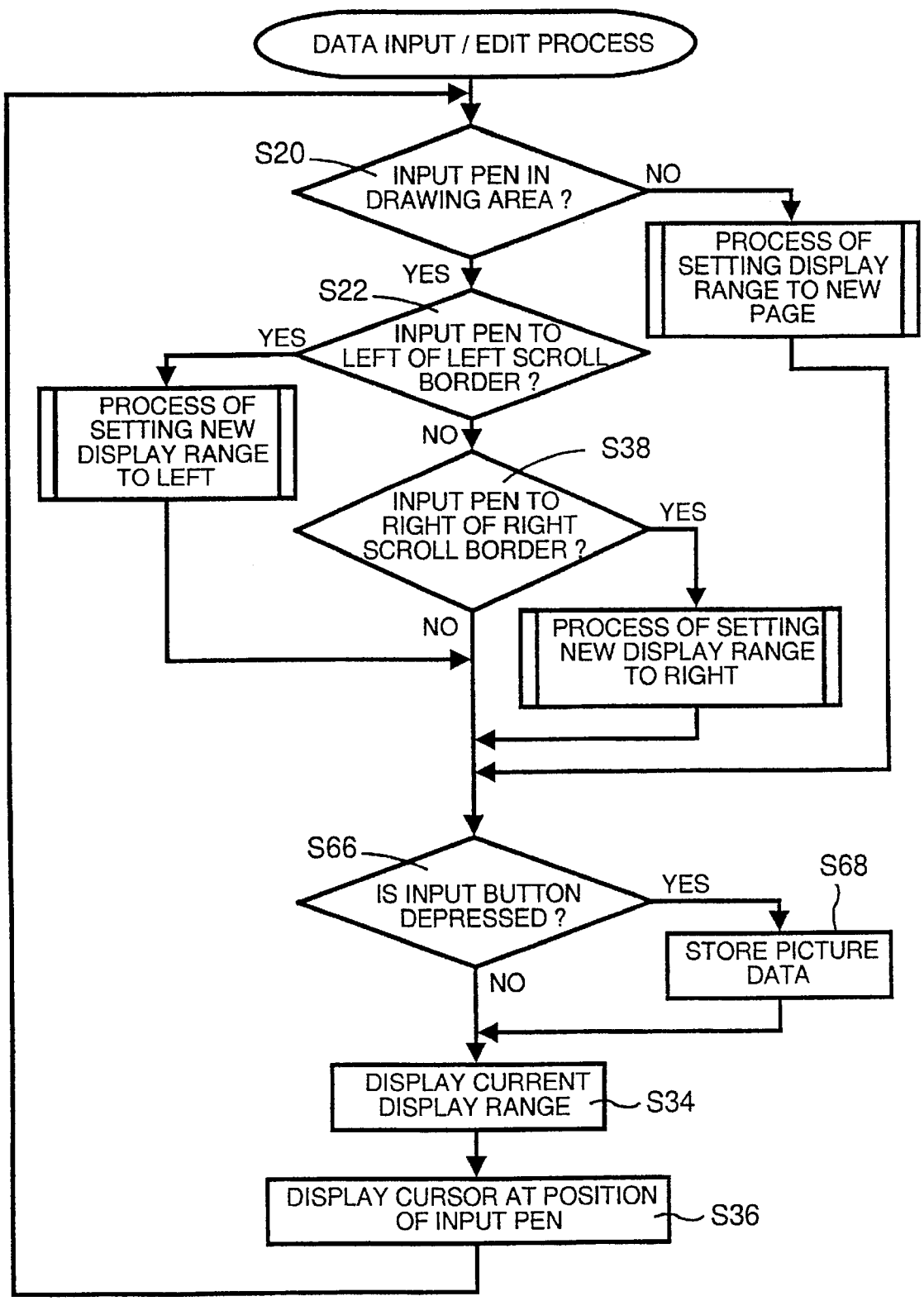
FIGS. 4A, 4B, 4C and 4D are flow charts of an image input and editing method embodying the invention.

As shown in the flow chart of FIG. 4A, when the process begins, in step 20, a check is made to see if the input pen 8 is pointing to a position in the drawing area 10A. If the input pen 8 is pointing to a position in the drawing area (step 20: yes), the process proceeds to step 22. If the input pen 8 is not pointing to a position on the drawing area 10A (step 20: no), the process proceeds to the page switching process shown in FIG. 4D, which is described in detail below.

Figure 4B:
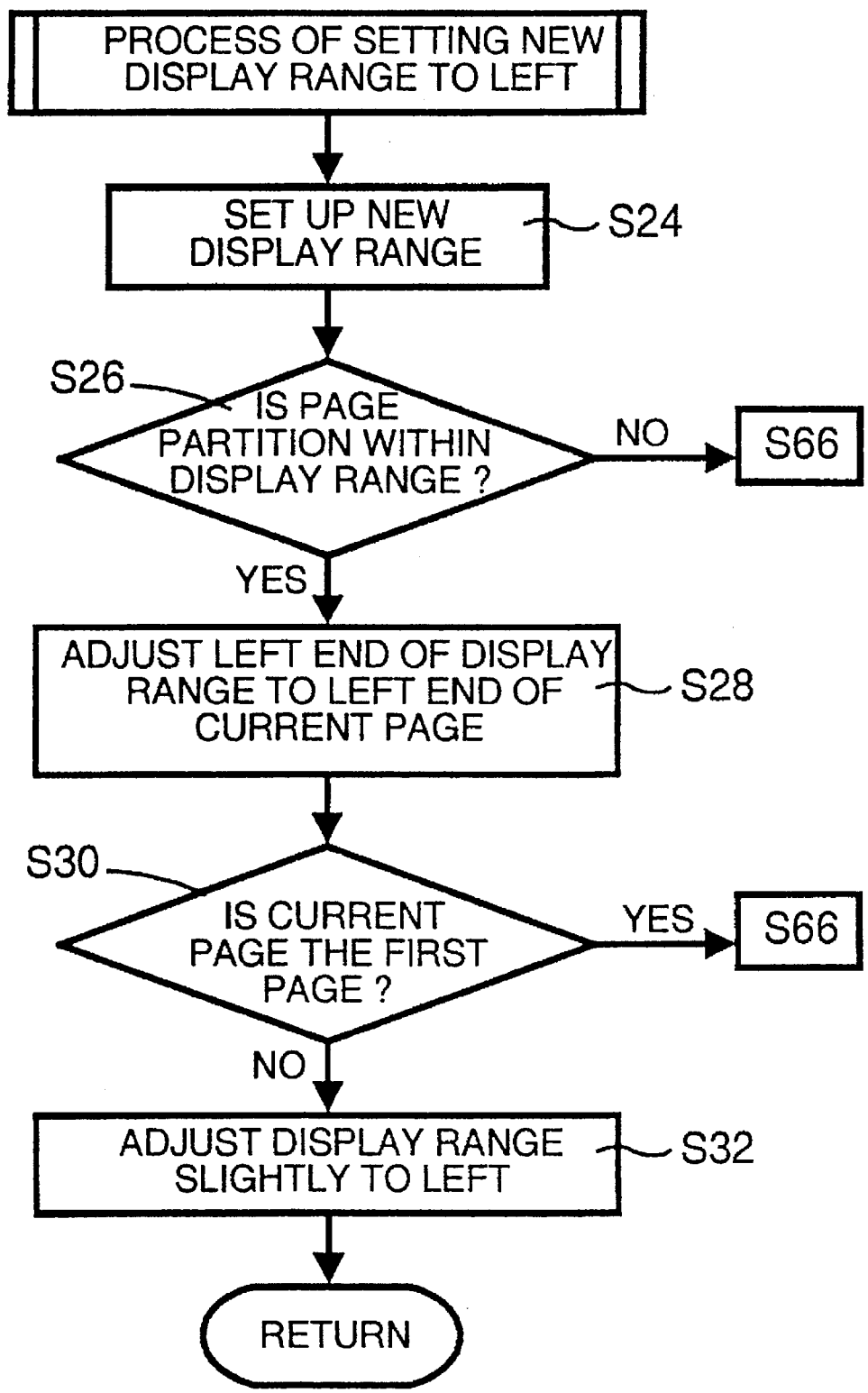
Figure 6:
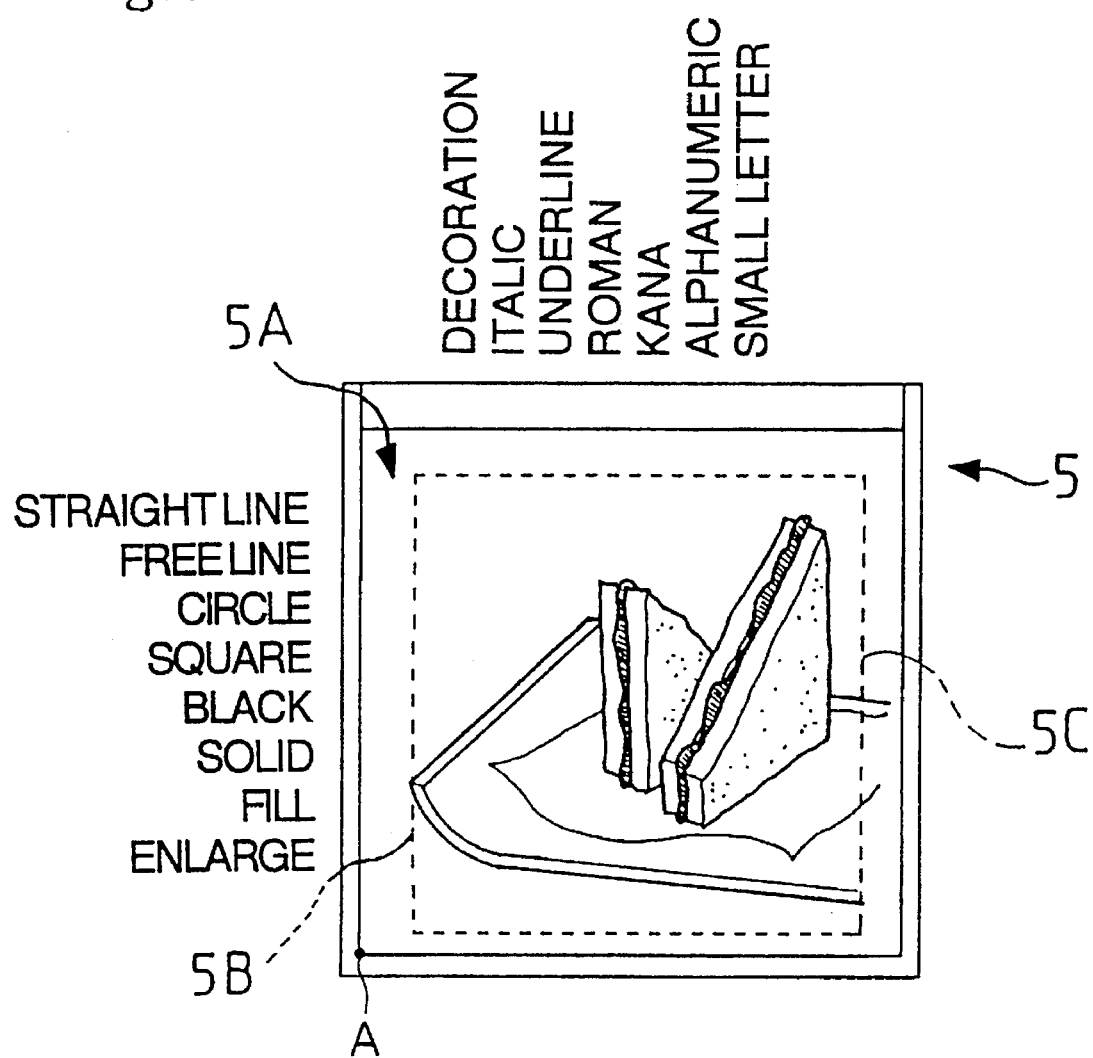
FIG. 6 is a diagram showing a portion of an image displayed on a display screen of an apparatus embodying the invention.

In step 22, a check is made to see if the x-coordinate of the position of the input pen 8 is smaller than the x-coordinate of the left scroll border 5B of the display screen 5, as shown in FIG. 6. This judgement is made by comparing the x-coordinate of the input pen 8 with the x-coordinate of the left scroll border 5B. If the x-coordinate of the input pen 8 is smaller than that of the left scroll border 5B, i.e., if the input position is to the left of the left scroll border 5B (step 22: yes), a new display range is set for the display screen in steps 24–32, as shown in FIG. 4B. If the x-coordinate of the input pen 8 is greater than that of the left scroll border 5B, i.e., if the input position is to the right of the left scroll border 5B (step 22: yes), the process proceeds to step 38.

As shown in FIG. 4B, in step 24, a new display range is set for the display screen. The new display range includes a new half-area section to the left of the input position and a half-area section to the right of the input position.

The process then proceeds to step 26, where a check is made to see if the display range set up in step 24 includes a portion other than the current page (the page indicated by the current page counter 26). The judgement is based on whether or not the x-coordinate of a page partition, e.g., X=100 or X=200, exists between the left and right ends of the new display range set up in step 24. If the x-coordinate of a page partition does not exist in the display range (step 26: no), the process continues to step 66. If the display range set up in step 24 includes a portion other than the current page, i.e., the x-coordinate of page partition exists within the new display range (step 26: yes), the process continues to step 28.

In step 28, the x-coordinates of the left end of the new display range is adjusted to coincide with the left end position of the current page. Consequently, the display begins from the starting position of the current page, and the page partition on the left side of the current page coincides with the left-end position of the display range. The process then proceeds to step 30.

In step 30, a check is made to see if the current page is the first page. If the current page is the first page (step 30: yes), the process proceeds to step 66. If the current page is not the first page (step 30: no), the process proceeds to step 32.

In step 32 the display range is adjusted slightly to the left, and the process continues to step 66. The reason for shift of the display range to the left when the current page is not the first page is to append the end portion of the previous page so that the user can see the connecting sections of the pages.

Returning to step 22, if the x-coordinate of the input position is greater than that of the left scroll border 5B (step 22: no), the process proceeds to step 38. In step 38, a check is made to determine if the x-coordinate of the input pen is greater than that of the right scroll border 5B. If the x-coordinate of the input position is smaller than that of the right scroll border 5B (step 38: no), which indicates that the position of the input pen 8 is between the left and right scroll borders, the process proceeds to step 66. If the x-coordinate of the input position is greater than that of the right scroll border 5B (step 38: yes), i.e., if the input position is to the right of the right scroll border 5C, the process proceeds to step 40, where a new display range is set for the display screen, as shown in FIG. 4C.

Figure 4C:
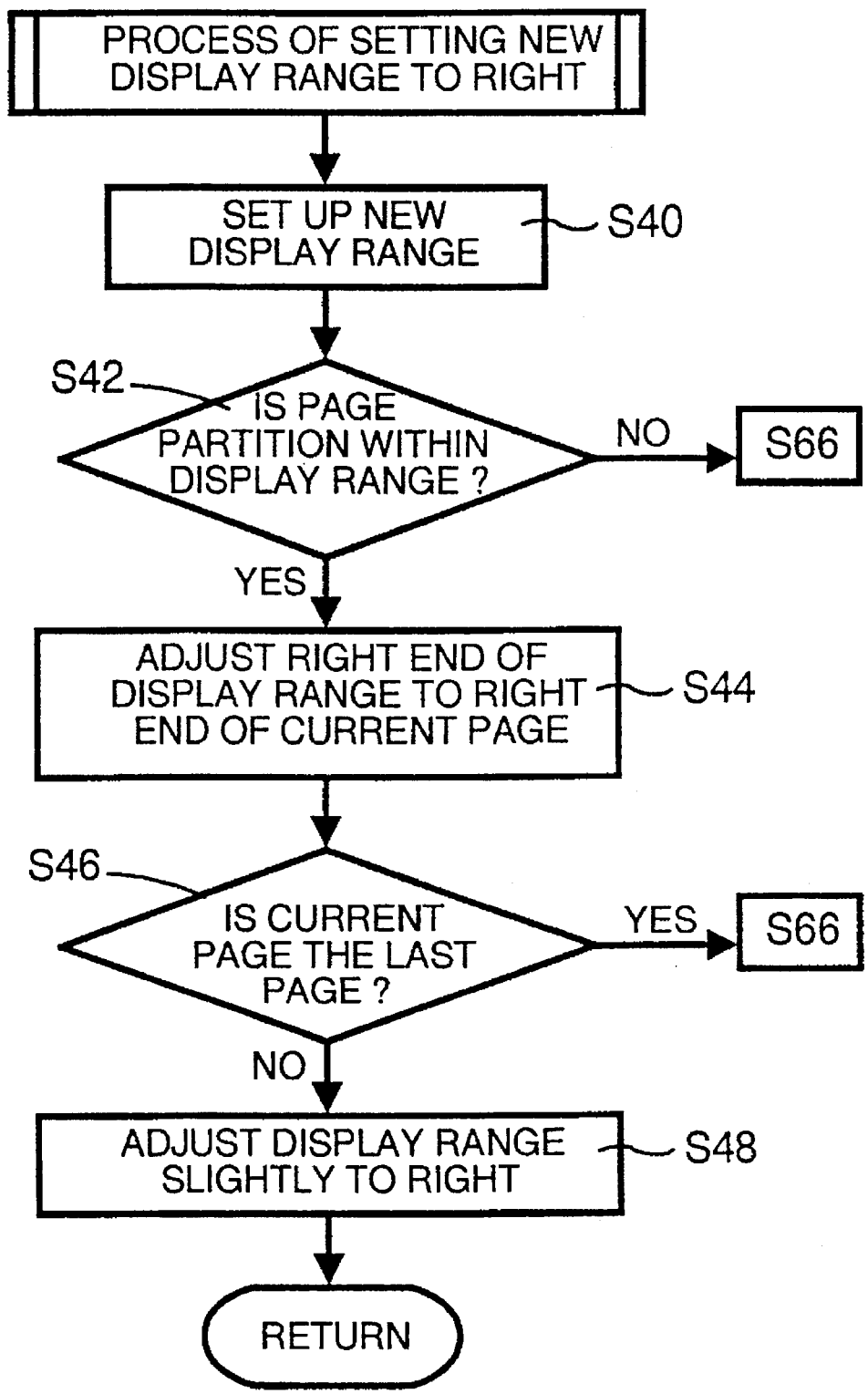

As shown in FIG. 4C, in step 40, a new display range is set up for the display screen. The new display range includes half-area sections on the left and right of the position of the input pen 8. The process then continues to step 42.

In step 42, a check is made to determine whether the display range set up in step 40 includes a portion other than the current page (indicated by the current page counter 26). This judgement is based on whether the x-coordinate of a page partition, e.g., X=100 or X=200, exists between the x-coordinates of the left and right ends of the new display range. If the new display range does not include a page partition (step 42: no), the process continues to step 66. If the display range includes a page partition (step 42: yes), the process continues to step 44.

In step 44, the right end of the new display range is adjusted to correspond with the x-coordinate of the right end of the current page indicated by the current page counter 26. The process then proceeds to step 46.

In step 46, a check is made to determine if the current page is the last page. This judgement is made based on the page number indicated by the current page counter 26 and the total page numbers stored in the page memory 25. If the current page is the last page (step 46: yes), the sequence proceeds to step 66. If the current page is not the last page (step 46: no), the process proceeds to step 48.

In step 48 the display range is shifted slightly to the right, and the sequence proceeds to step 66. The reason for the shift of the display range to the right when the current page is not the last page is to append the end portion of the succeeding page so that the user can see the connecting sections of the pages.

Figure 4D:
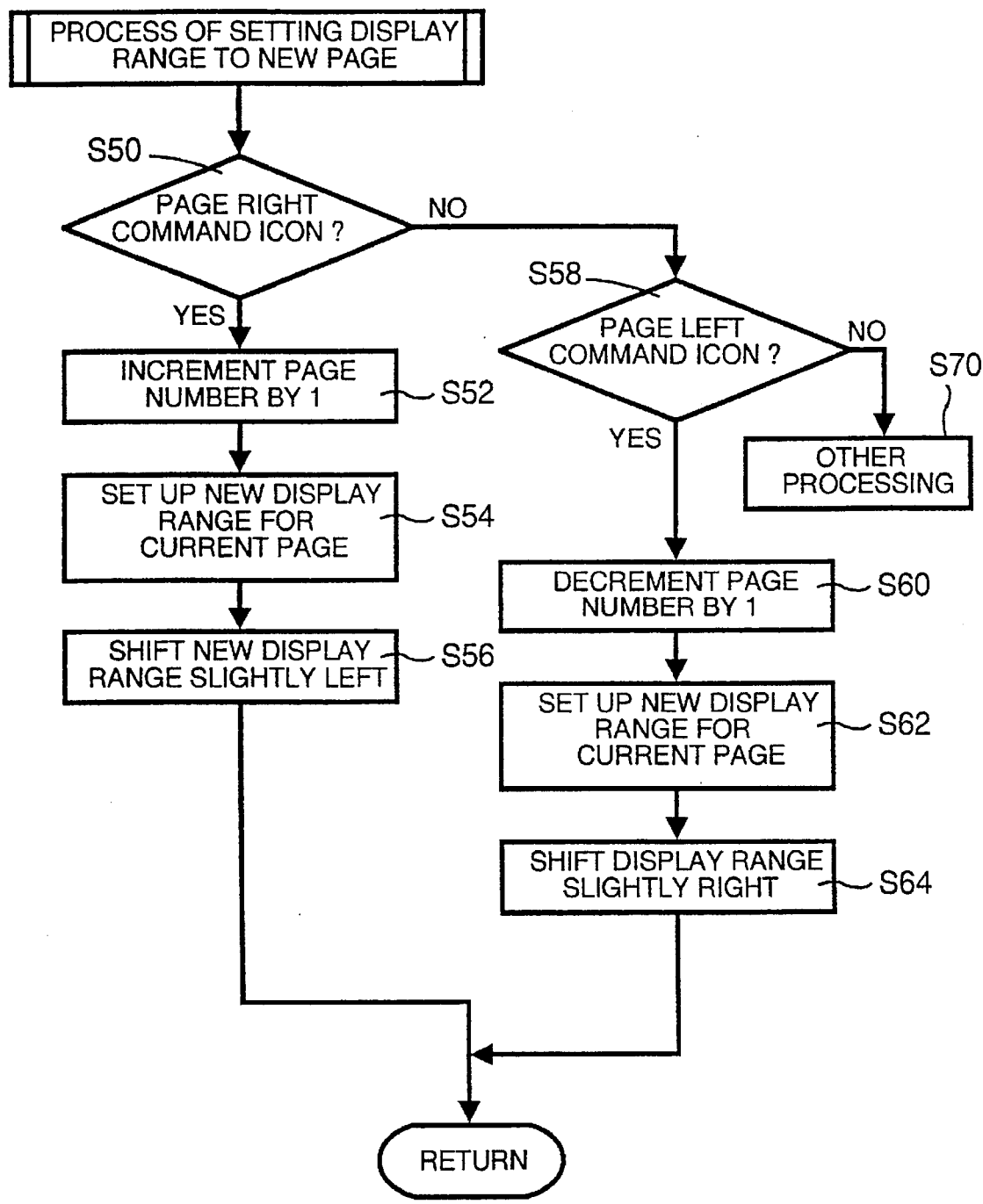

If, in step 20, it was determined that the input pen 8 was not pointing to a position in the drawing area 10A, the process proceeds to a page switching process shown in FIG. 4D. The page switching process begins with step 50, where a check is made to determine if the input pen 8 points the page right command icon 18A on the graphic input panel 10. If the input pen 8 points to the page right command icon 18A, the process continues to step 52. If the input pen 8 does not point to the page right command icon 18A, the process proceeds to step 58.

In step 52, the page number of the current page counter 26 is incremented by one, and the process proceeds to step 54. In step 54, a new display range that shows the left-most portion of the newly set page is set up, and the process continues to step 56. In step 56, the new display range is shifted slightly to the left, and the process continues to step 66.

Accordingly, after advancing to a new page located to the right of the last displayed page, the new display area 5A will include a portion of the preceding page, and the user will be able to see the connecting portions of the pages.

In step 58, a check is made to see if the input pen 8 points to the page left command icon 18B. If the input pen 8 points to the page left command icon 18B, (step 50: no, step 58: yes), the process proceeds to step 60. If the input pen 8 does not point to the page left command icon 18B, the process proceeds to step 70, where other processing is accomplished.

In step 60, the page number of the current page counter 26 is decremented by one, and the process continues to step 62. In step 62, a new display range is set up, the new display range showing the right portion of the new page, and the process continues to step 64. In step 64, the display range is shifted slightly to the right, and the process continues to step 66.

Accordingly, after paging to the left, the display screen will display a small portion of the succeeding page so that the user can see the connecting sections of the pages.

If the input pen 8 points to a command icon, instead of a position in the drawing area 10A (step 20: no) and the input pen 8 is not pointing to either the cursor right command icon 18A (step 50: no) or the cursor left command icon 18B (step 58: no), a process specific to the activated command icon will take place in step 70. Afterward, the process may end, or it may continue to step 20, where another check is made to see if the light pen 8 has pointed to another portion of the input screen.

As shown in FIG. 4A, in step 66, a check is made to see if the input button 8A on the input pen 8 is depressed. If the input button 8A is not depressed, the process continues to step 34. On the other hand, if the input button 8A is depressed, which indicates that the user wishes to input graphic data, the process continues to step 68. In step 68, graphic data corresponding to the current position of the input pen 8 is stored. The process then continues to step 34.

In step 34, the portion of the image within the display range set up in any of the preceding steps is displayed in the display area 5A, and the process continues to step 36. In step 36, the cursor is displayed at the position on the display screen corresponding to the position of the input pen 8.

After the cursor is placed at the display position corresponding to the input position in step 36, the sequence returns to step 20 and another check is made to see if the light pen has pointed to another portion of the input screen.

When the tape printing apparatus 1, operates as described above, and the user points to an arbitrary position on the input panel area 10A with the input pen 8, the cursor will be moved to the indicated position, and the display screen will be automatically adjusted, if necessary, to display the portions of the image surrounding the indicated position.

Figure 11:
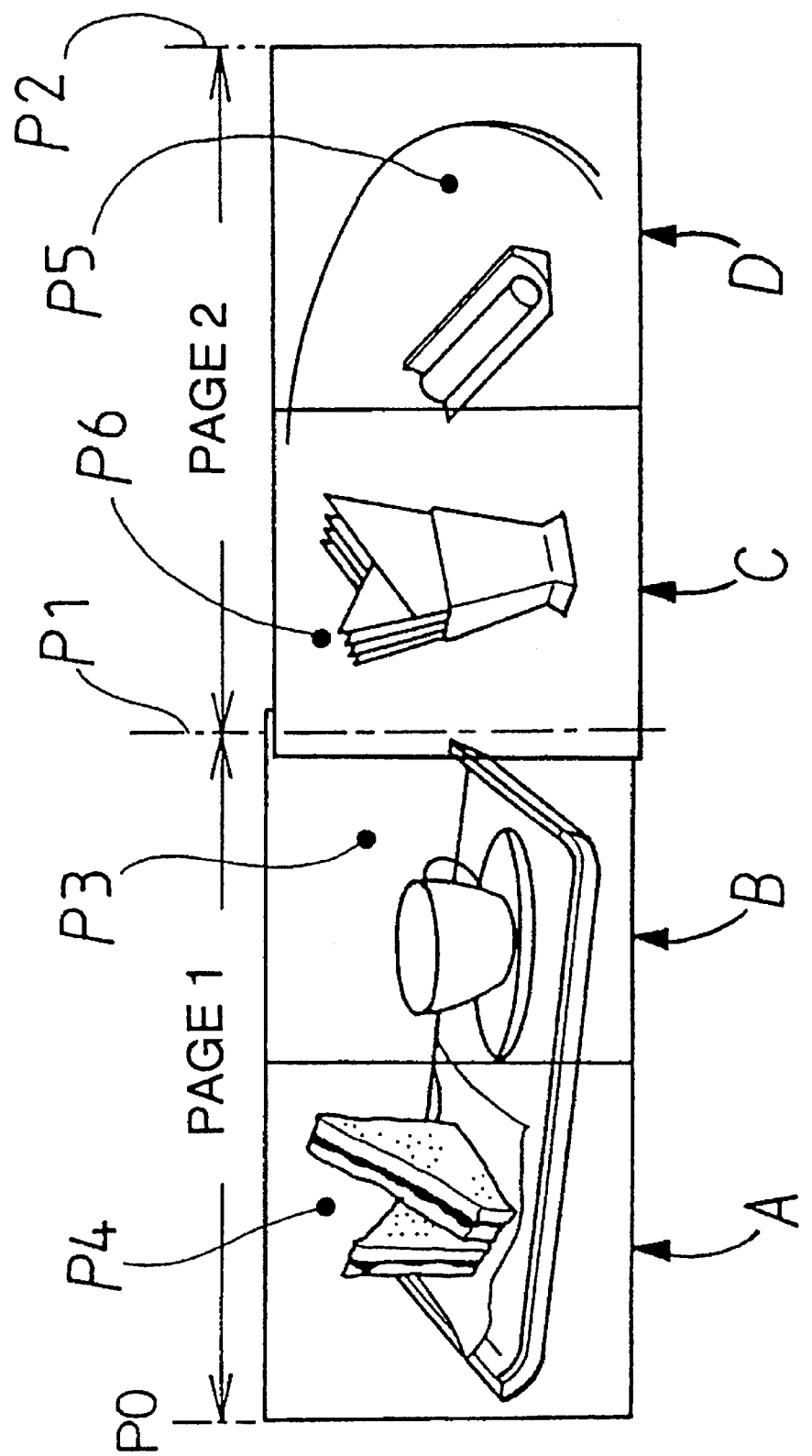
FIG. 11 is a diagram showing a series of images drawn on two consecutive pages.

Next, an image input/edit operation embodying the invention will be explained in more detail in connection with the flow charts of FIGS. 4A and 4B, and 11. In the following explanation, the user places two pattern sheets under the touch-panel, to input an image F, from left to right, on two consecutive pages, as shown in FIG. 11. It is assumed that the x-coordinates P1 and P2 (X=100 and X=200) of the first and second page partitions are already stored in the ROM 21.

Initially, the user draws the left-hand portion (sandwiches) of the image F with the input pen 8. The drawn image is displayed in the display area 5A of the display screen 5, as shown in FIG. 6. When the user begins to draw the right-hand portion of the image F, the input position of the input pen 8 will go to the right of the right scroll border 5C. In this case, the x-coordinate of the input position becomes greater than that of the right scroll border 5C (step 20: yes, step 22: no, step 38: yes), and a new display range is set up that includes the half-area sections on both sides of the input position (step 40).

Figure 7:
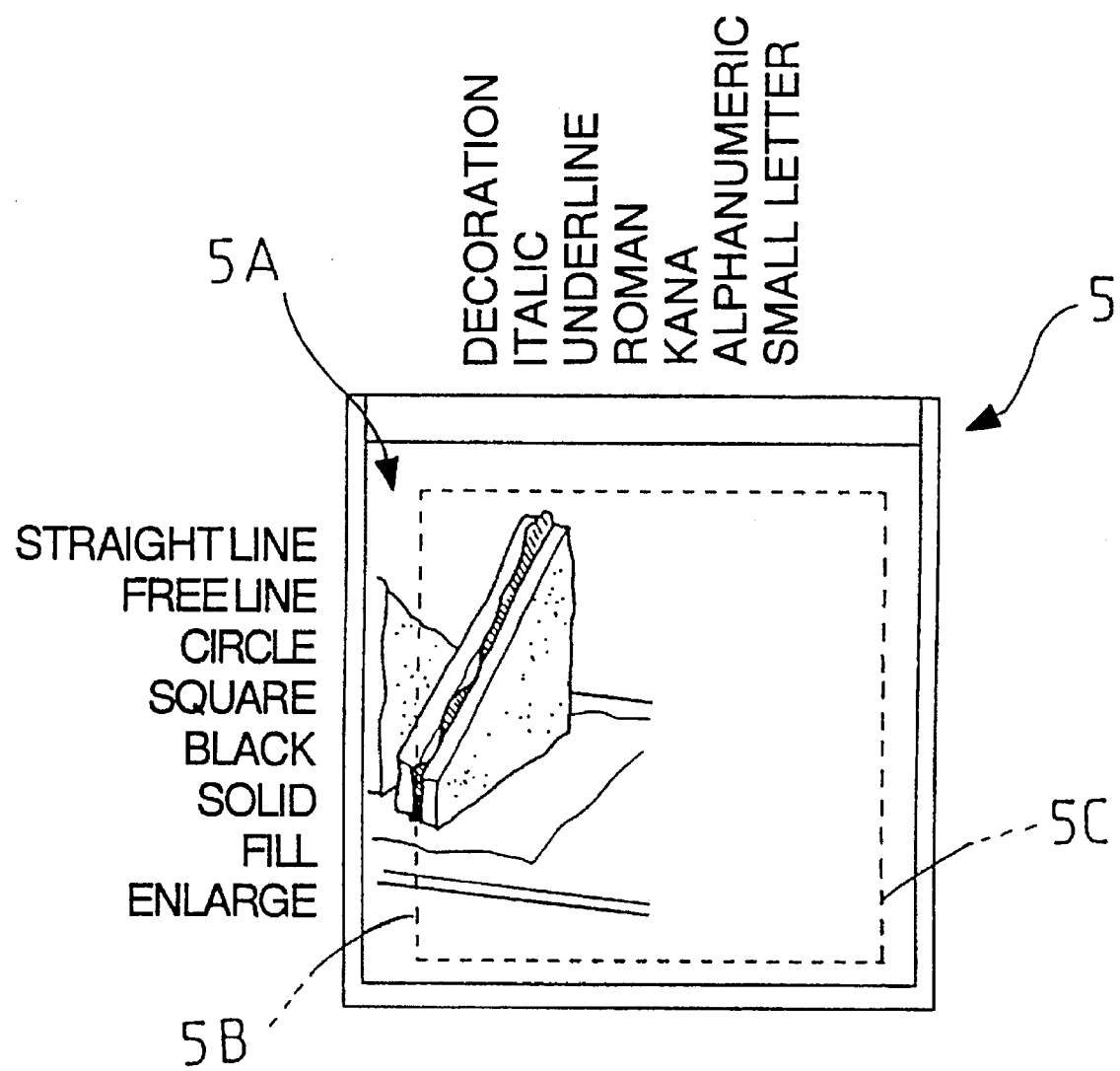
FIG. 7 is a diagram showing the display screen of FIG. 6 after the display range has been scrolled to the right relative to the display range shown in FIG. 6.

At this point, the user is still drawing the image of the first page (current page), and the new display range will not include the x-coordinate of a page partition (step 42: no), therefore the image existing in the new display range set up in step 40 will be displayed in the display area 5A (step 34), as shown in FIG. 7.

Figure 8:
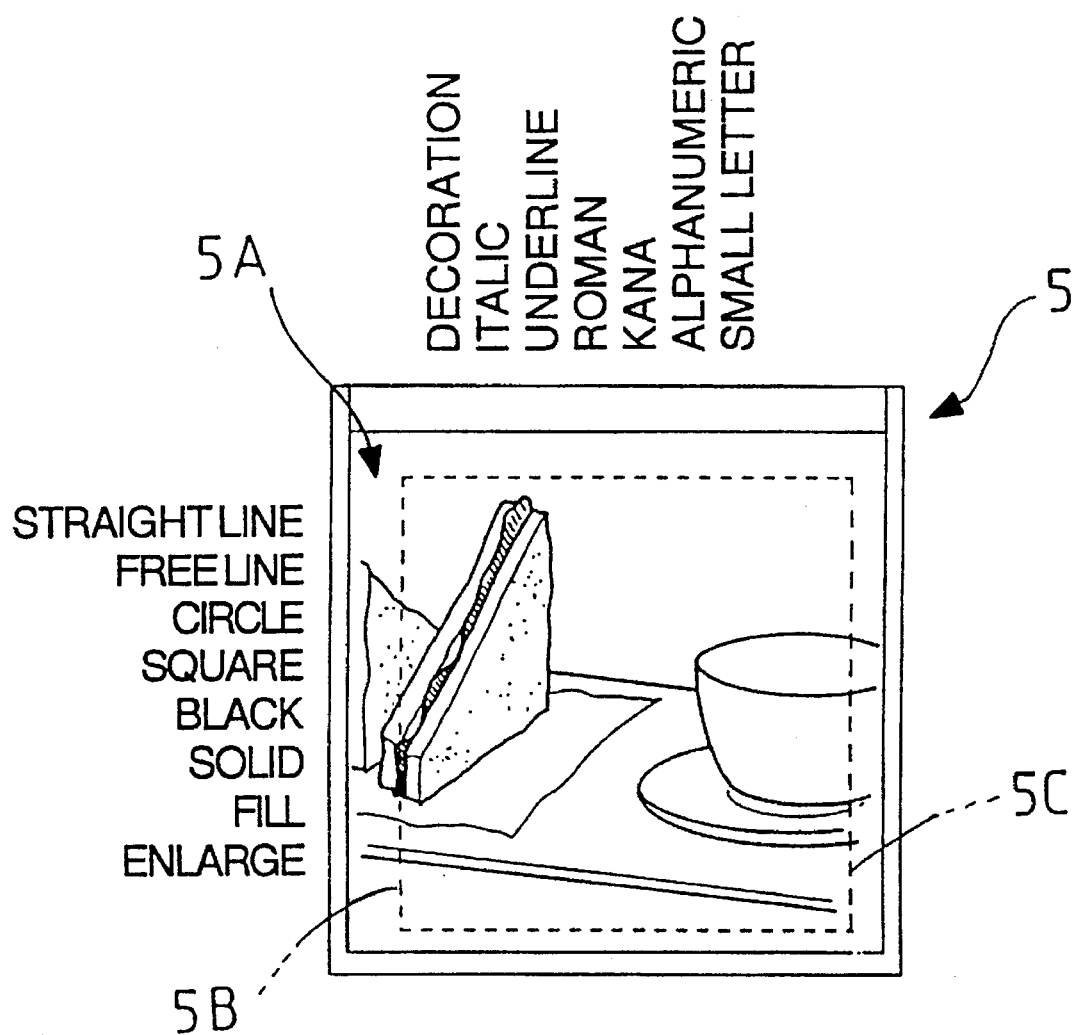
FIG. 8 is a diagram showing the display screen of FIG. 6 after a portion of the image has been added to the portion of the image shown in FIG. 7.
Figure 9:
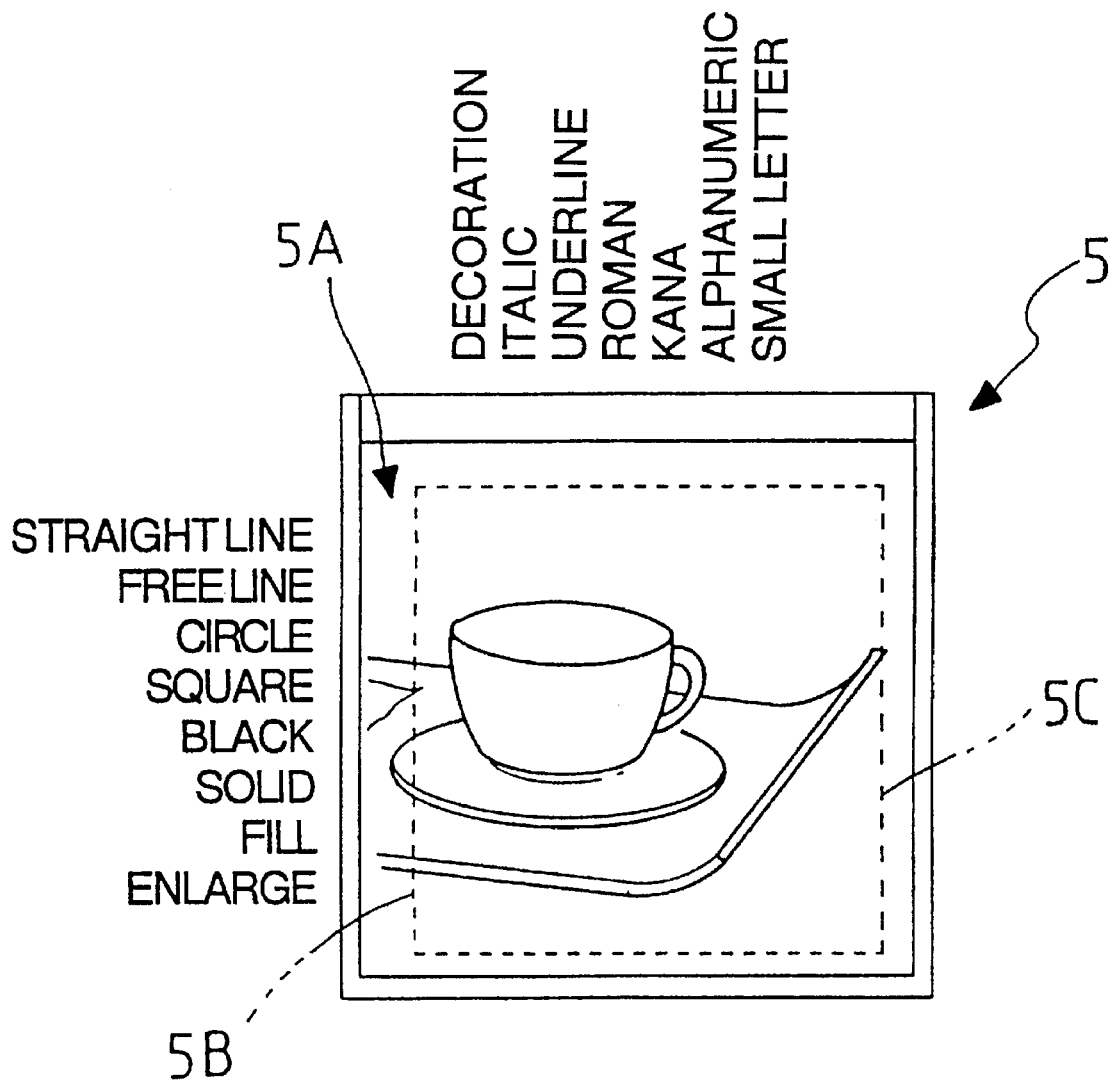
FIG. 9 is a diagram showing the display screen of FIG. 6 after the display range has been scrolled to the right relative to the display range shown in FIG. 8.

The user will then continue to draw the right-hand portion (coffee cup) of the image F, and the display area 5A will eventually appear as shown in FIG. 8. When the user begins to enter the right-hand portion of image F as shown in FIG. 7, the display range will shift again, as described previously, the user will continue to draw the coffee cup, and eventually the image shown in the display area 5A of the display screen 5 will appear as shown in FIG. 9.

Figure 10:
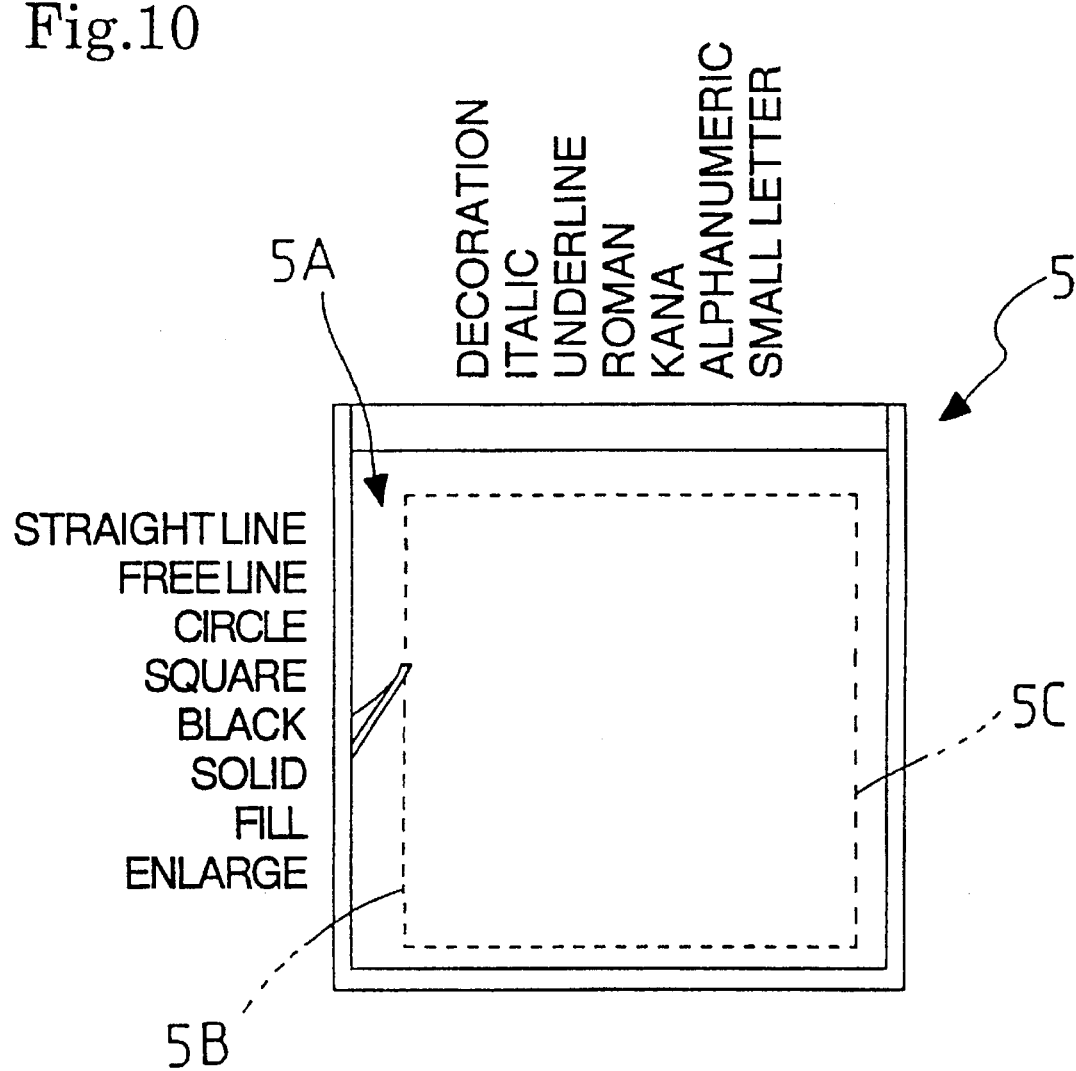
FIG. 10 is a diagram showing the display screen of FIG. 6 after it has been adjusted to display the first portion of a next page.

After the user has entered the first page of the image, the user points to the page-right key with the light pen 8 so he can draw the remainder of the image (step 50: yes) on a new page. The page number of the current page counter 26 will be incremented by one to become "2" (step 52). The x-coordinate of the left end of the display range is made coincident with the starting position of the second page (step 54), and the display range is shifted to the left (step 56). As a result, the display screen will appear as shown in FIG. 10 (step 34). The display range is shifted slightly to the left in the display area 5A so that the user can see the connecting sections between the first and second pages, and thus easily find the starting position of the second page.

The user replaces the pattern sheet for the first page with the pattern sheet for the second page under the graphic input panel 10, and proceeds to draw the second page of the image in the same manner as the first page. Data corresponding to an image comprised of the first and second pages is thereby stored in the RAM 22.

A display/scrolling operation that can be used in an embodiment of the invention to edit an inputted image will now be explained in connection with FIG. 11. It is assumed that initially, the image of display range A (sandwiches) in FIG. 11 is displayed in the display area 5A of the display screen 5 as shown in FIG. 6.

If the user points to the position P3 in the drawing area 10A of the graphic input panel 10 with the intention of modifying a portion of coffee cup, the detected x-coordinate of the input position P3 will be found greater than that of the right scroll border 5C of the display area 5A (step 20: yes, step 22: no, step 38: yes), and a new display range made up of the half-area sections on both sides of the input position P3 is set up (step 40). Because this new display range includes the x-coordinate (X=100) of page partition P1 (step 42: yes), the right end of the display range is made coincident with the x-coordinate (X=100) of the ending position of the first page (step 44). Because the current page (first page) is not the last page (second page) (step 46: no), the display range is shifted slightly to the right beyond the page partition P1 of x-coordinate X=100 (step 48). Consequently, the image existing in the newly set-up display range B (coffee cup) appears in the display area 5A as shown in FIG. 9.

If the user then points to position P4 with the intention of modifying a portion of sandwiches, the detected x-coordinate of the input position P4 will be found smaller than that of the left scroll border 5B of the display area 5A shown in FIG. 9 (step 20: yes, step 22: yes). Accordingly, a new display range made up of the half-area sections on both sides of the input position P4 is set up (step 24). Because this new display range does not include the x-coordinates X=0 and X=100 of page partitions P0 and P1 (step 26: no), there is no need to adjust the display range, and the image existing in the display range A appears in the display area 5A of the display screen 5 (step 34).

Figure 12:
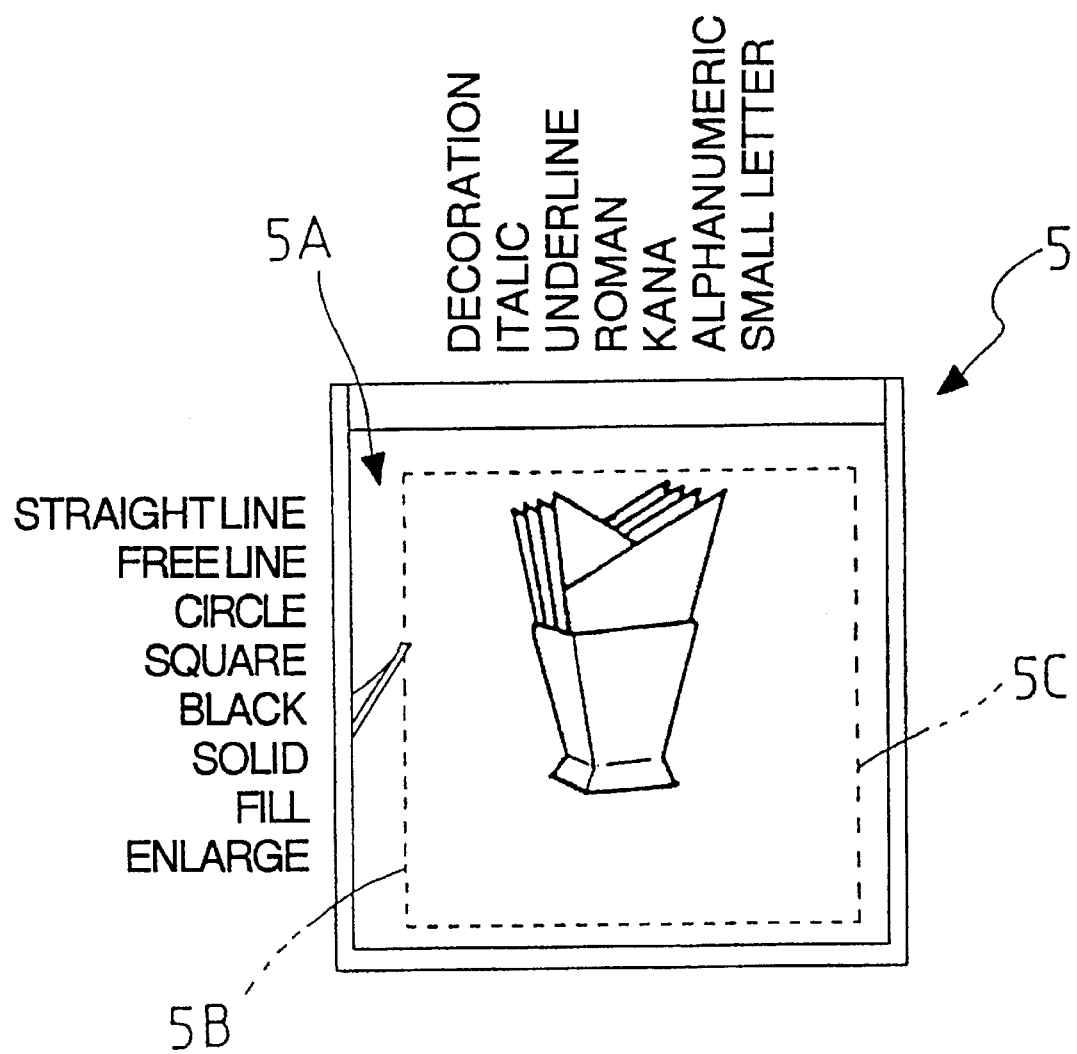
FIG. 12 is a diagram showing a display screen displaying a portion of the image on the second page shown in FIG. 11.

If the user subsequently points to the page right command icon 18A with the intention of modifying the second page (step 20: no, step 50: yes), the page number in the current page counter 26 is incremented by one to become "2" (step 52). The x-coordinate of the left end of the display range is shifted to be coincident with the starting position of the second page (step 54), and the display range is shifted slightly to the left (step 56). Consequently, the image appears in the display area 5A as shown in FIG. 12 (step 34). The display range is shifted slightly to the left of the left edge of the second page so the user can see the connecting section between the first and second pages.

When the image of display range C in FIG. 11 (paper napkin) is being displayed in the display area 5A of the display screen 5 as shown in FIG. 12, and the user points to input position P5 with the intention of modifying a portion of the towel, the detected x-coordinate of the input position P5 will be greater than that of the right scroll border 5C of the display area 5A shown in FIG. 12 (step 20: yes, step 22: no, step 38: yes). Accordingly, a new display range made up of the half-area sections on both sides of the input position P5 is set up (step 40). Because the new display range includes the x-coordinate (X=200) of page partition P2 (step 42: yes), the x-coordinate of the right end of the new display range is made coincident with the ending position of the second page (step 44). Because the current page (second page) is the last page (step 46: yes), the image existing in the newly set-up display range appears as shown in area D (the towel) of FIG. 11.

If the user subsequently points to position P6 with the intention of modifying a portion of the paper napkin (step 20: yes), the detected x-coordinate of the input position P6 will be determined to be smaller than that of the left scroll border 5B of the display area 5A shown in area D (step 22: yes), and a new display range made up of the half-area sections on both sides of the input position P6 is set up (step 24). Because the new display range includes the x-coordinate (X=100) of page partition P1 (step 26: yes), the left end of the display range is made coincident with the x-coordinate of the starting position of the current page (second page) (step 28). Because the current page is the second page (step 30: no), the display range is shifted slightly to the left (step 32). Consequently, the image (paper napkin) existing in the newly set-up display range appears as shown in FIG. 12.

As described above in detail, the tape printing apparatus 1 of this embodiment is designed to automatically and continuously set up a display range of the display area 5A to include half-area sections on both sides of the current input position of the input pen 8 on the drawing area 10A of the graphic input panel 10, so that images which are too large to be displayed on the display screen 5 may be easily entered and edited.

For example, when the user moves the point of the input pen 8 continuously from the left end to the right end of the graphic input panel 10, the display screen automatically shows the portion of image pointed to by the pen. When the user points to a position of the graphic input panel which is out of the current display range, the screen is switched immediately to display the portion of the image surrounding that position.

Because the control program detects whether or not the current display range includes a page partition, when the new display range lies over multiple pages, the left end or right end of the new display range is shifted to be made coincident with the starting position or ending position of the current page indicated by the page counter 26. Accordingly, images are prevented from being displayed across a page border in the display area 5A of the display screen 5, and the position of the page partitions is shown clearly. Consequently, the user can input images that extend over multiple pages sequentially and accurately.

In addition, because the display range is shifted slightly to the left unless it is the first page, and slightly to the right unless it is the last page, when the displayed section of the image borders between two pages, the display range will always include an ending section of a previous page, or a starting section of the succeeding page. This allows the user to see clearly the adjoining portions of the image so that he can draw and edit images easily and accurately.

While the present invention has been described in connection with specific embodiments, it will be apparent to those skilled in the art that many changes and modifications may be made without departing from the spirit and scope of the invention. For example, the display range could be scrolled vertically in the y-coordinate direction instead of, or in addition to, the horizontal scrolling in the x-coordinate direction.

What is claimed is:

1. A device for inputting and displaying an image that may extend over a plurality of pages, wherein page partitions exist between pages, comprising:

an input device for inputting an image, the input device enabling a user to indicate particular positions on an image;

a display screen for displaying a display range of an image that extends over only a portion of a page, wherein a first predetermined line positioned adjacent a first side of the display range corresponds to a first scroll border, and wherein a second predetermined line positioned adjacent a second side of the display range opposite the first side corresponds to a second scroll border;

a position detector for detecting if the input device indicates a position on an image that does not correspond to a position in the display range between the first and second scroll borders; and a scrolling device for setting a new display range for the display screen that includes approximately equal sized portions of the input image on either side of the position indicated by the input device when the position detector detects that the input device indicates a position on an image that does not correspond to a position in the display range between the first and second scroll borders.

2. The device of claim 1, wherein the first scroll border comprises a vertical line positioned adjacent a left side of the display range, wherein the second scroll border comprises a vertical line positioned adjacent a right side of the display range, and wherein the position detector detects if the input device indicates a position on an image that corresponds to a position in the display range to the left of the first scroll border or to the right of the second scroll border.

3. The device of claim 1, further comprising:

a current page indicator that indicates a page number of a page within which the majority of a new display range lies;

a page partition detector for detecting when a new display range set by the scrolling device includes a page partition; and a display range adjustor that adjusts a new display range set by the scrolling device so that an end portion of the new display range corresponds to an end portion of the current page indicated by the current page indicator when the page partition detector detects that the new display range includes a page partition.

4. The device of claim 3, wherein the display range adjustor comprises a first display range adjustor, and further comprising a second display range adjustor that adjusts a new display range set by the first display range adjustor a predetermined amount so that the new display range includes a small portion of an adjacent page of an image.

5. The device of claim 4, further comprising:

a first page detector that detects if the current page is the first page of an image; and a last page detector that detects if the current page is the last page of an image, and wherein the second display range adjustor adjusts a new display range set by the first display range adjustor a predetermined amount to the left when the new display range includes a left end portion of a page of an image and the first page detector does not detect that the current page is the first page, and wherein the second display range adjustor adjusts a new display range set by the first display range adjustor a predetermined amount to the right when the new display range includes a right end portion of a page of an image and the last page detector does not detect that the current page is the last page.

6. The device of claim 5, wherein the input device comprises a graphic input panel and an input pen, and wherein the position detector detects a position of the input pen on the graphic input panel.

7. The device of claim 1, wherein the input device comprises a graphic input panel and an input pen, and wherein the position detector detects a position of the input pen on the graphic input panel.

8. The device of claim 1, wherein the input device allows a user to input a hand-drawn image, and wherein the display screen displays at least a portion of the hand-drawn input image.

9. The device of claim 1, further comprising a printing device for printing an image input with the input device on an elongated recording medium.

10. A device for inputting and displaying an image that may extend over a plurality of pages, wherein page partitions exist between pages, comprising:

image input means for inputting an image and for indicating particular positions on an image;

display means for displaying a display range of an image that extends over only a portion of a page, wherein a first predetermined line positioned adjacent a first side of the display range corresponds to a first scroll border, and wherein a second predetermined line positioned adjacent a second side of the display range opposite the first side corresponds to a second scroll border;

position detecting means for detecting if the image input means indicates a position on an image that does not correspond to a position in the display range between the first and second scroll borders; and scrolling means for setting a new display range for the display means that includes approximately equal sized portions of an image on either side of a position indicated by the image input means when the position detecting means detects that the image input means indicates a position on the input image that does not correspond to a position in the display range between the first and second scroll borders.

11. The device of claim 10, wherein the first scroll border comprises a vertical line positioned adjacent a left side of the display range, wherein the second scroll border comprises a vertical line positioned adjacent a right side of the display range, and wherein the position detecting means detects if the image input means indicates a position on an image that corresponds to a position in the display range to the left of the first scroll border or to the right of the second scroll border.

12. The device of claim 10, further comprising:

current page indicating means for indicating a page number of a page within which the majority of a new display range lies;

page partition detection means for detecting when a new display range set by the scrolling means includes a page partition; and display range adjusting means for adjusting a new display range set by the scrolling means so that an end portion of the new display range corresponds to an end portion of the current page indicated by the current page indicating means when the page partition detection means detects that the new display range includes a page partition.

13. The device of claim 12, wherein the display range adjusting means comprises first display range adjusting means, and further comprising second display range adjusting means for adjusting a new display range set by the first display range adjusting means a predetermined amount so that the new display range includes a small portion of an adjacent page of an image.

14. The device of claim 13, further comprising:

first page detecting means for detecting if the current page is the first page of an image;

last page detecting means for detecting if the current page is the last page of an image, wherein the second display range adjusting means adjusts a new display range set by the first display range adjusting means a predetermined amount to the left when the new display range includes a left end portion of a page of an image and the first page detecting means does not detect that the current page is the first page, and wherein the second display range adjusting means adjusts a new display range set by the first display range adjusting means a predetermined amount to the right when the new display range includes aa right end portion of a page of an input image and the last page detecting means does not detect that the current page is the last page.

15. The device of claim 10, wherein the image input means comprises a graphic input panel and an input pen, and wherein the position detecting means detects a position of the input pen on the graphic input panel.

16. The device of claim 10, wherein the image input means allows a user to input a hand-drawn image, and wherein the display means displays at least a portion of the hand-drawn input image.

17. The device of claim 10, further comprising printing means for printing an image input with the image input means on an elongated recording medium.

18. A method for displaying an image that may extend over a plurality of pages, wherein page partitions exist between pages, comprising the steps of:

indicating positions on an image with an indicating device;

displaying a display range of an image that extends over only a portion of a page on a display screen, wherein a first predetermined line positioned adjacent a first side of the display range corresponds to a first scroll border, and wherein a second predetermined line positioned adjacent a second side of the display range opposite the first side corresponds to a second scroll border;

detecting if the indicating device indicates a position on an image that does not correspond to a position in the display range between the first and second scroll borders;

setting a new display range for the display screen that includes approximately equal sized portions of an image on either side of the position indicated by the indicating device when the position indicated by the indicating device does not correspond to a position in the display range between the first and second scroll borders; and displaying the set new display range on the display screen.

19. The device of claim 18, wherein the first scroll border comprises a vertical line located adjacent a left side of the display range, wherein the second scroll border comprises a vertical line located adjacent a right side of the display range, and wherein the step of detecting if the indicating device indicates a position on an image that does not correspond to a position in the display range between the first and second scroll borders comprises detecting if the indicating device indicates a position on an image that corresponds to a position in the display range that is left of the first scroll border, or right of the second scroll border.

20. The method of claim 18, further comprising the steps of:

determining a current page number of a page within which the majority of a set new display range lies when a new display range is set;

detecting if a set new display range includes a page partition when a new display range is set; and adjusting a set new display range so that an end portion of the new display range corresponds to an end portion of the determined current page when a set new display range is determined to include the coordinates of a page partition, and wherein the step of displaying a set new display range comprises displaying the adjusted set new display range on the display screen.

21. The method of claim 20, further comprising the step of shifting the adjusted set new display range a predetermined amount so that the shifted, adjusted set new display range includes a small portion of an adjacent page of an image when a new display range is set, and wherein the step of displaying a set new display range comprises displaying the shifted, adjusted set new display range on the display screen.

22. The method of claim 21, further comprising the steps of:

detecting if the current page is the first page of an image; and detecting if the current page is the last page of an image, and wherein the step of shifting an adjusted set new display range a predetermined amount so that the shifted, adjusted set new display range includes a small portion of an adjacent page of an image comprises the steps of:

shifting the adjusted set new display range a predetermined amount to the left when the set new display range includes a left end portion of a page of an image and the current page is not detected to be the first page, and shifting the adjusted set new display range a predetermined amount to the right when the set new display range includes a right end portion of a page of an image and the current page is not detected to be the last page.

23. The device of claim 18, wherein the indicating device comprises a graphic input panel and an input pen, and wherein the step of detecting the position indicated by the indicating device comprises detecting the position of the input pen on the graphic input panel.

24. The method of claim 18, further comprising the step of storing image data corresponding to a position of the indicating device in response to a user executed command so that the user may input a handdrawn image.

25. The method of claim 18, further comprising the step of printing an image on an elongated recording medium.

* * * * *